(12) United States Patent
Ma et al.

(10) Patent No.: US 8,230,730 B2
(45) Date of Patent: Jul. 31, 2012

(54) COMPREHENSIVE TEST BED FOR VEHICLE BODY

(75) Inventors: Fei Ma, Shandong (CN); Jie Chen, Shandong (CN); Yuanfeng Pang, Shandong (CN)

(73) Assignee: Qingdao Sifang Rolling Stock Research Institute Co., Ltd., Shandong (CN)

( * ) Notice: Subject to any disclaimer, the term of this patent is extended or adjusted under 35 U.S.C. 154(b) by 0 days.

(21) Appl. No.: 13/171,309

(22) Filed: Jun. 28, 2011

(65) Prior Publication Data
US 2011/0252876 A1 Oct. 20, 2011

Related U.S. Application Data

(63) Continuation of application No. PCT/CN2010/074455, filed on Jun. 25, 2010.

(30) Foreign Application Priority Data

Nov. 10, 2009 (CN) .......................... 2009 1 0210782

(51) Int. Cl.
*G01M 17/00* (2006.01)
(52) U.S. Cl. .................................................... 73/116.01
(58) Field of Classification Search ............... 73/116.01
See application file for complete search history.

(56) References Cited

U.S. PATENT DOCUMENTS

| | | | | |
|---|---|---|---|---|
| 3,581,560 | A | * | 6/1971 | Odier .......................... 73/116.06 |
| 4,263,809 | A | * | 4/1981 | Petersen et al. ................... 73/798 |
| 4,305,300 | A | * | 12/1981 | Petersen et al. ................... 73/788 |
| 4,793,047 | A | * | 12/1988 | Curtis et al. .............. 29/407.08 |
| 7,584,671 | B2 | * | 9/2009 | Hsiao .............................. 73/856 |

FOREIGN PATENT DOCUMENTS

| | | |
|---|---|---|
| CN | 201004014 | 1/2008 |
| CN | 101281085 | 10/2008 |
| CN | 101699247 | 4/2010 |
| EP | 0 310 520 | 4/1989 |
| EP | 1 918 689 | 5/2008 |

OTHER PUBLICATIONS

International Search Report of International Application No. PCT/CN2010/074455, dated Sep. 30, 2010.
International Search Report of International Application PCT/CN2010/074455, dated Sep. 30, 2010.

* cited by examiner

*Primary Examiner* — Freddie Kirkland, III
(74) *Attorney, Agent, or Firm* — J. C. Patents (57) ABSTRACT

The present invention relates to a comprehensive test bed for vehicle body, which comprises an vehicle body static strength testing apparatus, an vehicle body air tightness testing apparatus, an vehicle coupler strength testing apparatus and an vehicle body mode testing apparatus, wherein the tested vehicle body is provided with a strain foil and a displacement sensor; and the strain foil and the displacement sensor are connected with a data acquisition system. The comprehensive test bed for the vehicle body can perform an vehicle body static strength test on various rail passenger vehicles, an vehicle body steel structure vibration mode test, an vehicle body partial assembly vibration mode test and an vehicle body air tightness test, and can realize strength tests on partial key components of the vehicle body (a transition vehicle coupler, a return vehicle coupler, an vehicle body chassis cross beam, a hoisting structure, an end structure, and the like). The application range of the test bed includes high speed railway train units, urban rail vehicles, railway ordinary vehicles, maglev trains and straddle type single-rail vehicles. The comprehensive test bed for the vehicle body has a wide application range and can automatically carry out various tests on the same test bed, so that the test bed realizes simple and convenient testing process and convenient operation, and saves labor force and labor time.

1 Claim, 9 Drawing Sheets

COMPREHENSIVE TEST BED FOR VEHICLE BODY

CROSS-REFERENCE TO RELATED APPLICATIONS

This application is a continuation of International Application No. PCT/CN2010/074455, filed on Jun. 25, 2010, which claims the priority benefit of Chinese Patent Application No. 200910210782.0, filed on Nov. 10, 2009. The contents of the above identified applications are incorporated herein by reference in their entirety.

FIELD OF THE TECHNOLOGY

The present invention relates to a performance test apparatus for railway vehicle body, and particularly to a comprehensive test bed for vehicle body, which can test various performance indexes of high speed railway train units and urban railway vehicles.

BACKGROUND

High speed railway train units and urban railway vehicles have been widely used with the rapid development of rail traffic in our country. As the speed of the vehicles increases ceaselessly, in order to guarantee the safety of the railway transportation, stricter requirements on various performances of the vehicles are proposed, and in order to meet the demand of the development of rail traffic, better understand various performances of the vehicles and guarantee the quality of the vehicles produced, tests for various performance indexes of the vehicles are required, therefore, developing a test bed capable of testing various performance indexes of a tested vehicle comprehensively is significant for promoting the development of railway industry.

SUMMARY

The subject of the present invention is to provide a comprehensive test bed for vehicle body, which can test various performance indexes of the vehicle body.

The technical solution of the present invention is as below: a comprehensive test bed for vehicle body, the test bed comprises an vehicle body static strength testing apparatus, an vehicle body air tightness testing apparatus, an vehicle coupler strength testing apparatus and an vehicle body mode testing apparatus; the vehicle body to be tested is provided with a strain foil and a displacement sensor, and the strain foil and the displacement sensor are connected with a data acquisition system;

(1) the vehicle body static strength testing apparatus comprises a longitudinal loading apparatus, a vertical loading apparatus and an accident load loading apparatus;

A. the longitudinal loading apparatus comprises a link rod, a fixed cross beam and a moving cross beam [[positioned on the link rod, and a transfer beam, wherein the fixed cross beam is positioned at one end of the link rod and the moving cross beam is positioned at the other end of the link rod to constitute a closed frame, the tested vehicle is positioned in the middle of the frame, the transfer beam is positioned between the fixed cross beam and the moving cross beam and is sleeved on the link rod, the fixed cross beam is provided with a group of loading oil cylinders, the front end of the loading oil cylinder is connected with the transfer beam, and the transfer beam and the moving cross beam are provided with loading ejector rods and buffer stem ejector rod base; the link rod is arranged in multiple sections which are connected to each other via a threaded support base, the loading ejector rod comprises a pressure base connected with the transfer beam, a ball head link rod, a connecting rod and an ejector rod base, the connecting rod is connected with the ball head link rod via a flat pin or a nut, the connecting rod is connected with the ejector rod base via another flat pin, and the connecting rod is further provided with a load sensor which is connected with the data acquisition system;

B. the vertical loading apparatus adopts ① a tool oil cylinder for loading, and comprises a loading cross beam, a pull rod, a tool oil cylinder and a force bearing device, wherein the cross beam is arranged on the pull rod, the bottom part of the cross beam is equipped with the tool oil cylinder and a force sensor, the force bearing device is positioned inside the vehicle body, the tool oil cylinder comes into contact with the force bearing device during loading in order to apply pressure to the force bearing device, the force bearing device is designed as a sleeper, the pull rod is fixed on the ground via a fixed anchor, and the force sensor is connected with the data acquisition system; the vertical loading apparatus adopts ② a water bag for loading, and comprises a water bag placed in the vehicle and a water circulation system, a water inlet pipeline is provided with an electromagnetic flow sensor, and the electromagnetic flow sensor is connected with the data acquisition system;

C. the accident load loading apparatus comprises a loading rack, a loading oil cylinder and a force sensor; the loading rack comprises an upright post, an upper fixed beam and a lower fixed beam both connected with the upright post, a cross beam positioned on the upright post and a support plate positioned on the cross beam, the support plate is detachably connected with the cross beam, the loading oil cylinder is fixedly mounted on the support plate, the force sensor is positioned on the loading oil cylinder and is connected with an information processing system, the upright post is provided with a rail along which the cross beam can slide and be fixed, a cross beam lifting mechanism is further arranged between the upper fixed beam and the lower fixed beam, the rail is a dovetail-shaped slide block, the cross beam is provided with a dovetail slot, the cross beam lifting mechanism comprises a turbo speed reducer, a turbine and a lead screw all fixedly mounted on the lower fixed beam, one end of the lead screw comes into action with the turbine and the other end thereof is fixed on the upper fixed beam via a bearing, and the cross beam is connected with the lead screw via a lead screw nut;

(2) the vehicle body air tightness testing apparatus comprises a gas source gas-supply system, the gas source gas-supply system is connected with a sealed vehicle body and comprises an air compressor chamber, a gas storage tank, a gas source purification device, a pressure regulating pipeline joint and a pressure sensor, and the pressure sensor is connected with the data acquisition system;

(3) the vehicle coupler strength testing apparatus mounts a tested vehicle coupler to the loading ejector rod of the moving cross beam by adopting the longitudinal loading apparatus in order to be in hanging connection with an vehicle coupler pull rod mounted on the transfer beam, the test is performed using the pulling force generated by the group of loading oil cylinders, the connecting rod connected with the tested vehicle coupler is provided with a load sensor, and the load sensor is connected with the data acquisition system;

(4) the vehicle body mode testing apparatus comprises a support apparatus for supporting the vehicle body, a vibration exciter mounted on the vehicle body and the data acquisition system connected with the vibration exciter, the supporting apparatus comprises a wheel pair, an vehicle frame and an air spring positioned on the vehicle frame, a support spring is arranged between the wheel pair and the vehicle frame, the bottom part of the vehicle frame is provided with support legs with each being provided with a screw hole, a transverse support adjusting device is arranged between the air spring and the vehicle frame, the air spring is fixedly mounted on the transverse support adjusting device, and during the test, the vehicle body falls onto the air spring, and simultaneously, the support spring is pressed downwards and the support legs of the vehicle frame come into contact with an auxiliary rail and are fixed by bolts; the vehicle frame is provided with a lifting lug and is connected with a wheel pair shaft via a lifting lug shaft.

The present invention has the advantages that: the comprehensive test bed for the vehicle body can perform an vehicle body static strength test on various rail passenger vehicles, an vehicle body steel structure vibration mode test, an vehicle body partial assembly vibration mode test and an vehicle body air tightness test, and can realize strength tests on partial key components of the vehicle body (a transition vehicle coupler, a return vehicle coupler, an vehicle body chassis cross beam, a hoisting structure, an end structure, and the like). The application range of the test bed includes high speed railway train units, urban rail vehicles, railway ordinary vehicles, maglev trains and straddle type single-rail vehicles. The comprehensive test bed the vehicle body has a wide application range and can automatically carry out various tests on the same test bed, so that the test bed realizes simple and convenient testing process and convenient operation, and saves labor force and labor time.

DETAILED DESCRIPTION

A further detailed description of embodiments of the present invention is given by reference to the drawings.

Figure 1:
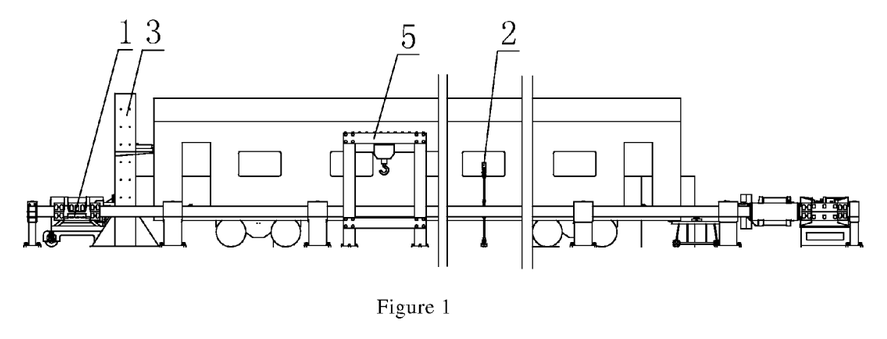
FIG. 1 is the structural schematic diagram of the present invention.

A comprehensive test bed for vehicle body comprises an vehicle body static strength testing apparatus, an vehicle body air tightness testing apparatus, an vehicle coupler strength testing apparatus and an vehicle body mode testing apparatus; the tested vehicle body is provided with a strain foil and a displacement sensor, and the strain foil and the displacement sensor are connected with a data acquisition system;

(1) the vehicle body static strength testing apparatus comprises a longitudinal loading apparatus 1, a vertical loading apparatus 2 and an accident load loading apparatus 3;

A. the longitudinal loading apparatus comprises a link rod 101, a fixed cross beam 102 and a moving cross beam 103 positioned on the link rod 101, and a transfer beam 104, wherein the fixed cross beam 102 is positioned at one end of the link rod 101 and the moving cross beam 103 is positioned at the other end of the link rod 101 to constitute a closed frame, the vehicle to be tested is positioned in the middle of the frame, the transfer beam 104 is positioned between the fixed cross beam 102 and the moving cross beam 103 and is sleeved on the link rod 101, the fixed cross beam 102 is provided with a group of loading oil cylinders 105, the front end of the loading oil cylinder is connected with the transfer beam 104, and the transfer beam 104 and the moving cross beam 103 are provided with loading ejector rods 106 and buffer stem ejector rod base 107. The link rod 101 is arranged in multiple sections which are connected to each other via threaded support base 108. The loading ejector rod 106 comprises a pressure base 109 connected with the transfer beam 104, a ball head link rod 110, a connecting rod 111 and an ejector rod base 112, the connecting rod 111 is connected with the ball head link rod 110 via a flat pin 113 or a nut 114, the connecting rod 111 is connected with the ejector rod base 112 via another flat pin 113, and the connecting rod 111 is further provided with a load sensor 115 for measuring the pulling force applied. During operation, the number of the link rod 101 is selected according to the model of the vehicle body to be tested, and the link rods 101 are interconnected via the link rod support bases 108, and the position of the moving cross beam 103 is adjusted to adapt to the loading of the vehicle bodies having different length; then the fixed cross beam 102 and the moving cross beam 103 are fixed, the vehicle body to be tested is positioned nearer the middle of the frame during the test, two ends of the frame are connected with the loading ejector rods 106, the group of loading oil cylinders 105 applies pressure to the vehicle body being tested via the transfer beam 104 and the loading ejector rods 106, and the stress and the deformation of the vehicle body are measured via the load sensor 115 as well as the strain foil and the displacement sensor both positioned on the vehicle body so as to analyze the static strength of the vehicle body.

Figure 7:
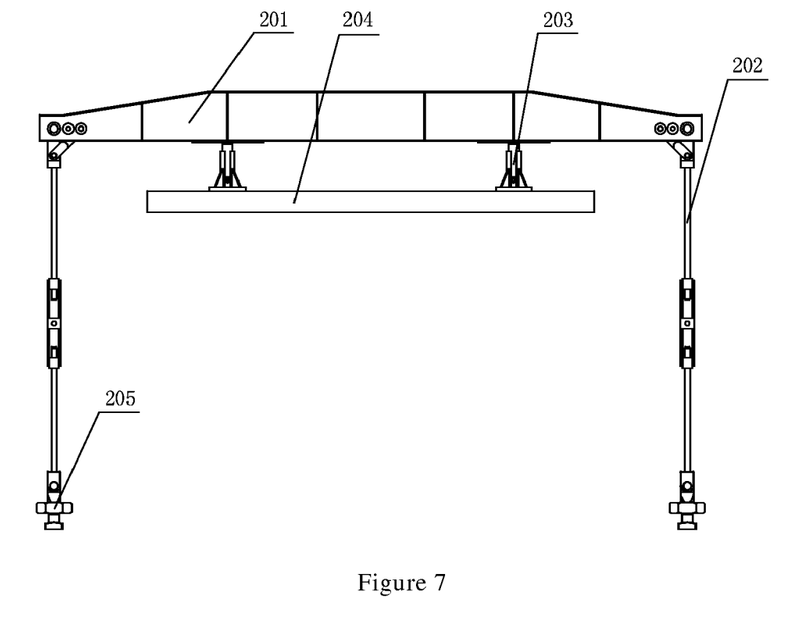
FIG. 7 is the structural schematic diagram of the vertical loading apparatus of the present invention in the manner of tool oil cylinder loading.

B. The vertical loading apparatus adopts ① a tool oil cylinder for loading, which is suitable for large load, and comprises a loading cross beam 201, a pull rod 202, a tool oil cylinder 203 and a force bearing device 204, wherein the cross beam 201 is arranged on the pull rod 202, the bottom part of the cross beam 201 is equipped with the tool oil cylinder 203, the force bearing device 204 is positioned inside the vehicle body. The tool oil cylinder 203 comes into contact with the force bearing device 204 during loading in order to apply pressure to the force bearing device. The force bearing device 204 is designed as a sleeper. The pull rod 202 is fixed on the ground via a fixed anchor 205. During the test, the sleepers are superposed inside the vehicle body, the loading cross beam 201 penetrates into the vehicle body through vehicle windows, the tool oil cylinder 203 and a force sensor are placed between the cross beam 201 and the sleeper, and two ends of the cross beam 201 are connected with a ground fixation apparatus via the pull rod 202. As a result, the vertical load required by the vehicle body is obtained by means of the loading of the tool oil cylinder 203. The data acquisition system tests the vertical loading capability of the vehicle body by acquiring the information of the force sensor, the strain foil and the displacement sensor. The vertical loading apparatus adopts ② a water bag for loading, which is suitable for medium and small loads, and comprises a water bag placed in the vehicle and a water circulation system, a water inlet pipeline is provided with an electromagnetic flow sensor, and the electromagnetic flow sensor is connected with the data acquisition system; before the test, the water bag is placed inside the vehicle, a proper amount of water simulating vertical load is added into the water bag, and the amount of added water is measured by the electromagnetic flow sensor.

Figure 8:
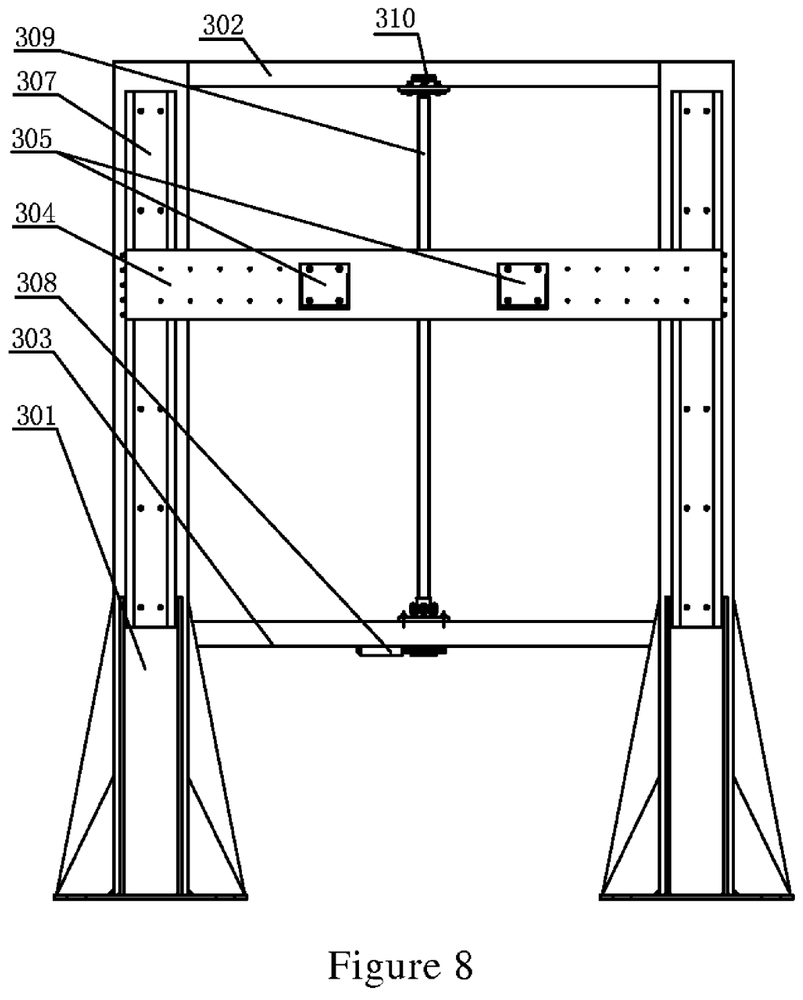
FIG. 8 is the structural schematic diagram of the accident load loading device of the present invention.
Figure 9:
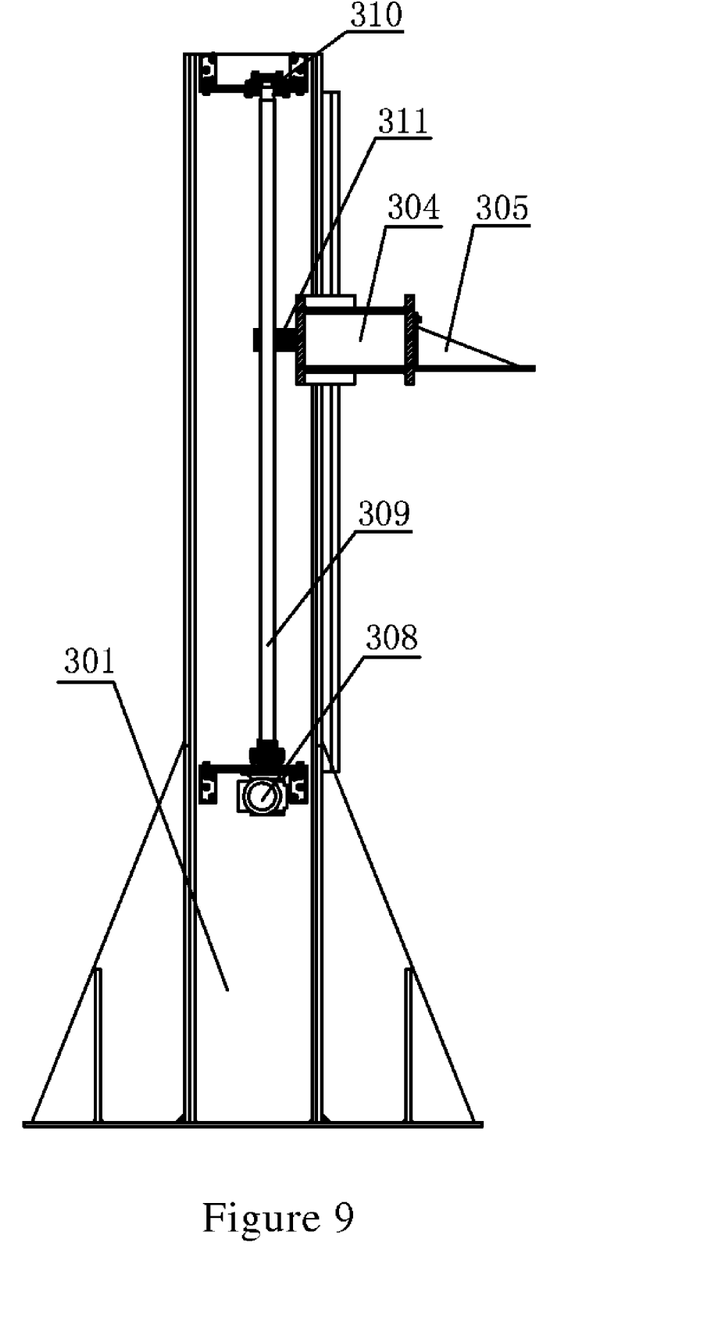
FIG. 9 is the lateral view of the FIG. 8.
Figure 10:
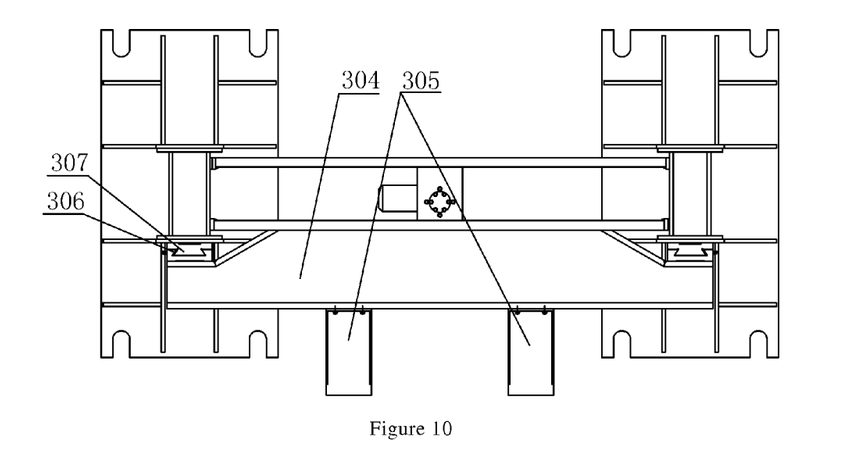
FIG. 10 is the top view of the FIG. 8.
Figure 11:
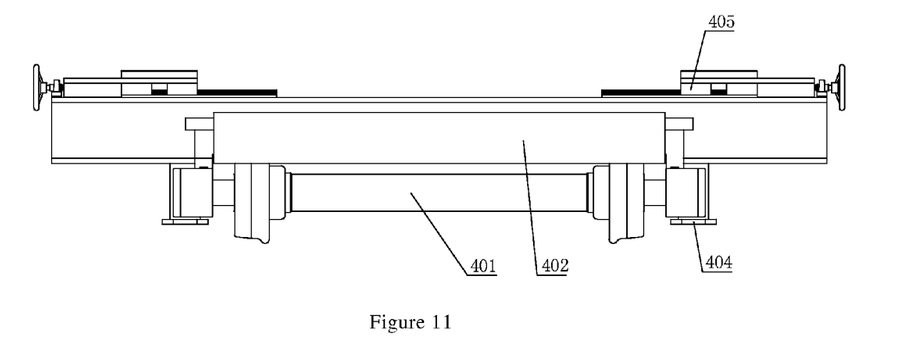
FIG. 11 is the structural schematic diagram of the mode test support device of the present invention.
Figure 12:
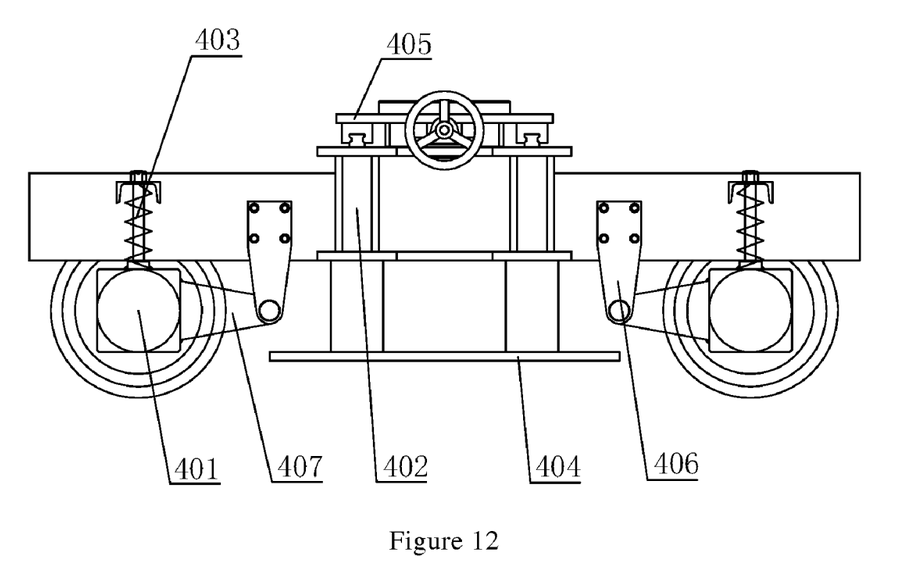
FIG. 12 is the lateral view of the FIG. 11 of the present invention.
Figure 13:
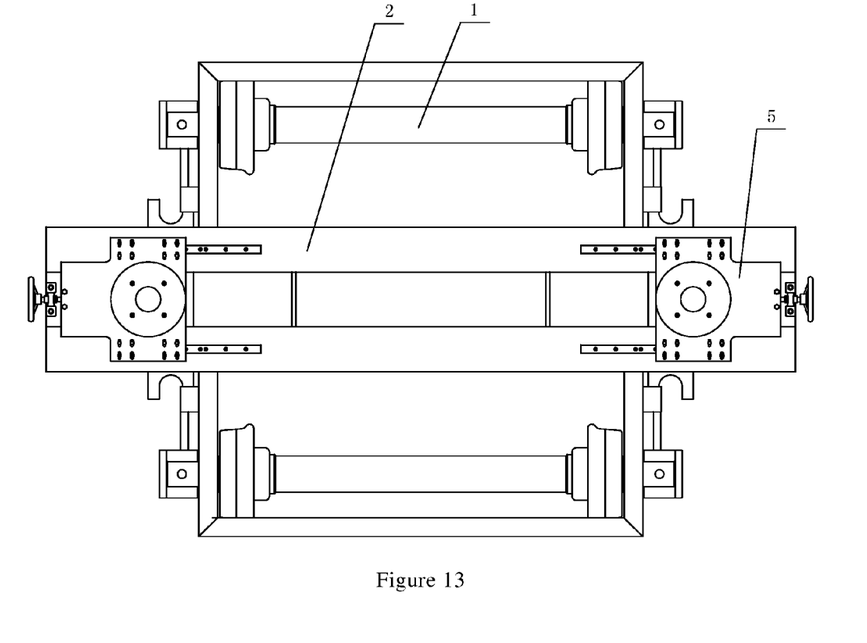
FIG. 13 is the top view of the FIG. 11 of the present invention.

C. The accident load loading apparatus comprises a loading rack, a loading oil cylinder and a force sensor; the loading rack comprises an upright post 301, an upper fixed beam 302 and a lower fixed beam 303 both connected with the upright post 301, a cross beam 304 positioned on the upright post 301 and a support plate 305 positioned on the cross beam 304, the support plate 305 and the cross beam 304 are respectively provided with an elongated round hole and a threaded hole the position of which can be adjusted in the horizontal direction and which can be fastened, the loading oil cylinder is fixedly mounted on the support plate 305, the force sensor is positioned on the loading oil cylinder and is connected with an information processing system, the upright post 301 is provided with a rail which is a dovetail-shaped slide block 307, the cross beam 304 is provided with a dovetail slot 306 and can slide and be fixed along the rail, a cross beam lifting mechanism is further arranged between the upper fixed beam 302 and the lower fixed beam 303. The cross beam lifting mechanism comprises a turbo speed reducer 308, a turbine and a lead screw 309 all fixedly mounted on the lower fixed beam 303, one end of the lead screw 309 comes into action with the turbine and the other end thereof is fixed on the upper fixed beam 302 via a bearing 310, and the cross beam 304 is connected with the lead screw 309 via a lead screw nut 311. During the accident load test, the accident load loading rack is arranged at one end of the vehicle body being tested as required, the bottom part of the loading rack is fixed with the rail on the ground, the support plate 305 on the accident load loading rack is adjusted according to the requirements of the model of the vehicle body to be tested so that the loading oil cylinder is supported at a proper position of the vehicle body, loading test is performed using the loading oil cylinder which is generally provided with the sleeper and which comes into contact the vehicle body via the sleeper, the loading force applied is detected via the force sensor, and the information is transmitted to the information processing system, simultaneously, the vehicle body is provided with a strain foil and a displacement sensor both connected with the information processing system and used for detecting the stress and the deformation of the vehicle body, and the information processing system detects the information and analyzes the accident load performances of the vehicle body according to the detected information.

Figure 2:
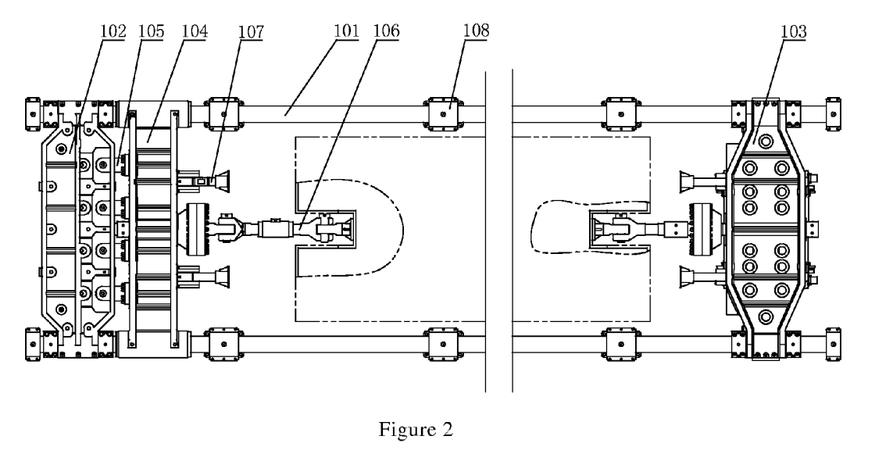
FIG. 2 is the structural schematic diagram of the longitudinal loading apparatus of the present invention.
Figure 3:
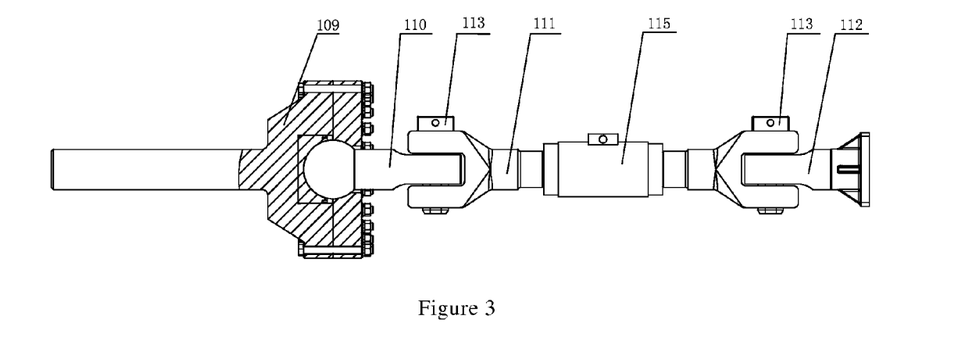
FIG. 3 is the structural schematic diagram of the front loading ejector rod of the present invention.
Figure 4:
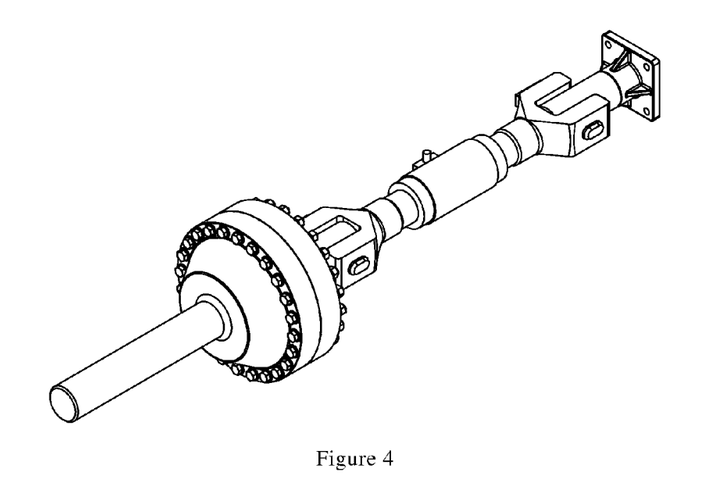
FIG. 4 is the three-dimensional structural schematic diagram of the front loading ejector rod of the present invention.
Figure 5:
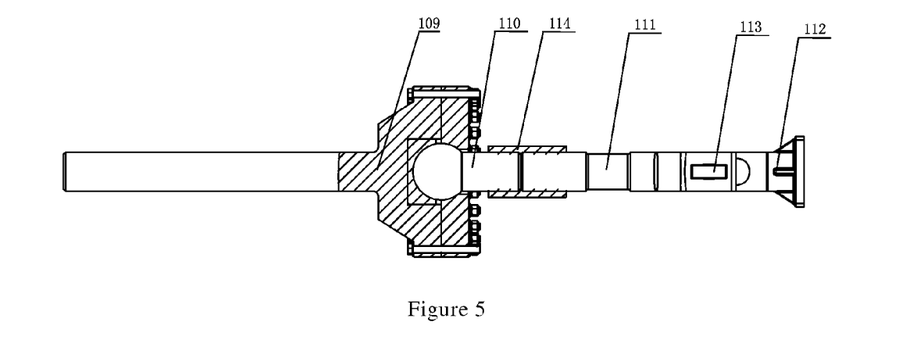
FIG. 5 is the structural schematic diagram of the rear loading ejector rod of the present invention.
Figure 6:
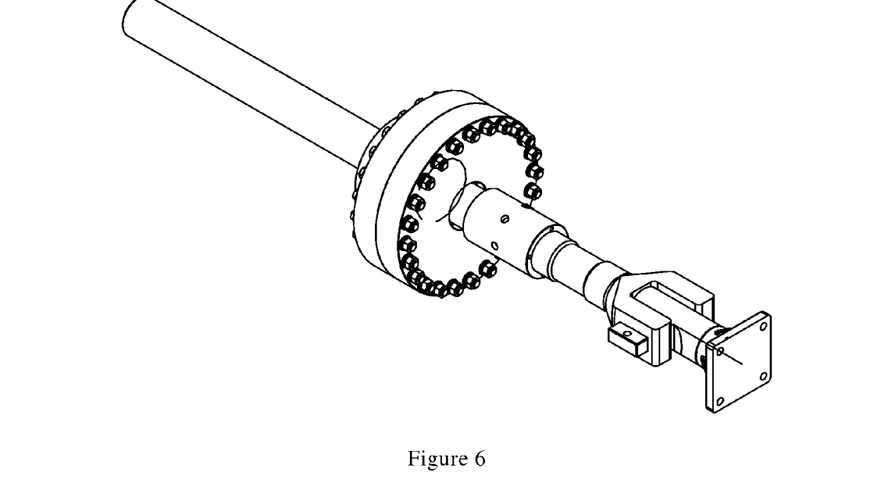
FIG. 6 is the three-dimensional structural schematic diagram of the rear loading ejector rod of the present invention.

(2) the vehicle body air tightness testing apparatus comprises a gas source gas-supply system, the gas source gas-supply system is connected with a sealed vehicle body and comprises an air compressor chamber, a gas storage tank, a gas source purification device, a pressure regulating pipeline joint and a pressure sensor, and the pressure sensor is connected with the data acquisition system;

(3) the vehicle coupler strength testing apparatus mounts a tested vehicle coupler to the loading ejector rod 106 of the moving cross beam 103 by adopting the longitudinal loading apparatus in order to be in hanging connection with an vehicle coupler pull rod mounted on the transfer beam 104, the test is performed using the pulling force generated by the group of loading oil cylinders 105, the connecting rod connected with the tested vehicle coupler is provided with a load sensor, and the load sensor is connected with the data acquisition system;

(4) the vehicle body mode testing apparatus comprises a support apparatus for supporting the vehicle body, a vibration exciter mounted on the vehicle body and the data acquisition system connected with the vibration exciter, the supporting apparatus comprises a wheel pair 401, an vehicle frame 402 and an air spring positioned on the vehicle frame 402, a support spring 403 is arranged between the wheel pair 401 and the vehicle frame 402, the bottom part of the vehicle frame 402 is provided with support legs 404 with each being provided with a screw hole, a transverse support adjusting device 405 is arranged between the air spring and the vehicle frame 402, the air spring is fixedly mounted on the transverse support adjusting device 405, and during the test, the vehicle body falls onto the air spring, and simultaneously, the support spring 403 is pressed downwards and the support legs 404 of the vehicle frame 402 come into contact with an auxiliary rail and are fixed by bolts. The vehicle frame 402 is provided with a lifting lug 406 and is connected with a wheel pair shaft via a lifting lug shaft 407. A plurality of groups of vibration exciters are arranged at corresponding positions of the vehicle body, the data acquisition system acquires the information of the vibration exciters, the strain foil and the displacement sensor so as to measure the performances of the vehicle body, and simultaneously, a suspending device 5 is arranged in test equipment in consideration of the requirements of other medium and small-scale model tests.

What is claimed is:

1. A comprehensive test bed for vehicle body, characterized in that: the test bed comprises an vehicle body static strength testing apparatus, an vehicle body air tightness testing apparatus, an vehicle coupler strength testing apparatus and an vehicle body mode testing apparatus, wherein the tested vehicle body to be tested is provided with a strain foil and a displacement sensor; and the strain foil and the displacement sensor are connected with a data acquisition system;

(1) the vehicle body static strength testing apparatus comprises a longitudinal loading apparatus, a vertical loading apparatus and an accident load loading apparatus A. the longitudinal loading apparatus comprises a link rod, a fixed cross beam and a moving cross beam positioned on the link rod, and a transfer beam, wherein the fixed cross beam is positioned at one end of the link rod and the moving cross beam is positioned at the other end of the link rod to constitute a closed frame, the tested vehicle is positioned in the middle of the frame, the transfer beam is positioned between the fixed cross beam and the moving cross beam and is sleeved on the link rod, the fixed cross beam is provided with a group of loading oil cylinders, the front end of the loading oil cylinder is connected with the transfer beam, and the transfer beam and the moving cross beam are provided with loading ejector rods and buffer stem ejector rod base; the link rod is arranged in multiple sections which are connected to each other via threaded support base, the loading ejector rod comprises a pressure base connected with the transfer beam, a ball head link rod, a connecting rod and an ejector rod base, the connecting rod is connected with the ball head link rod via a flat pin or a nut, the connecting rod is connected with the ejector rod base via another flat pin, and the connecting rod is further provided with a load sensor which is connected with the data acquisition system;

B. the vertical loading apparatus adopts ① a tool oil cylinder for loading, and comprises a loading cross beam, a pull rod, a tool oil cylinder and a force bearing device, wherein the cross beam is arranged on the pull rod, the bottom part of the cross beam is equipped with the tool oil cylinder and a force sensor, the force bearing device is positioned inside the vehicle body, the tool oil cylinder comes into contact with the force bearing device during loading in order to apply pressure to the force bearing device, the force bearing device is designed as a sleeper, the pull rod is fixed on the ground via a fixed anchor, and the force sensor is connected with the data acquisition system; the vertical loading apparatus adopts ② a water bag for loading, and comprises a water bag placed in the vehicle and a water circulation system, a water inlet pipeline is provided with an electromagnetic flow sensor, and the electromagnetic flow sensor is connected with the data acquisition system;

C. the accident load loading apparatus comprises a loading rack, a loading oil cylinder and a force sensor; the loading rack comprises an upright post, an upper fixed beam and a lower fixed beam both connected with the upright post, a cross beam positioned on the upright post and a support plate positioned on the cross beam, the support plate is detachably connected with the cross beam, the loading oil cylinder is fixedly mounted on the support plate, the force sensor is positioned on the loading oil cylinder and is connected with an information processing system, the upright post is provided with a rail along which the cross beam can slide and be fixed, a cross beam lifting mechanism is further arranged between the upper fixed beam and the lower fixed beam, the rail is a dovetail-shaped slide block, the cross beam is provided with a dovetail slot, the cross beam lifting mechanism comprises a turbo speed reducer, a turbine and a lead screw all fixedly mounted on the lower fixed beam, one end of the lead screw comes into action with the turbine and the other end thereof is fixed on the upper fixed beam via a bearing, and the cross beam is connected with the lead screw via a lead screw nut;

(2) the vehicle body air tightness testing apparatus comprises a gas source gas-supply system, the gas source gas-supply system is connected with a sealed vehicle body and comprises an air compressor chamber, a gas storage tank, a gas source purification device, a pressure regulating pipeline joint and a pressure sensor, and the pressure sensor is connected with the data acquisition system;

(3) the vehicle coupler strength testing apparatus mounts a tested vehicle coupler to the loading ejector rod of the moving cross beam by adopting the longitudinal loading apparatus in order to be in hanging connection with an vehicle coupler pull rod mounted on the transfer beam, the test is performed using the pulling force generated by the group of loading oil cylinders, the connecting rod connected with the tested vehicle coupler is provided with a load sensor, and the load sensor is connected with the data acquisition system;

(4) the vehicle body mode testing apparatus comprises a support apparatus for supporting the vehicle body, a vibration exciter mounted on the vehicle body and the data acquisition system connected with the vibration exciter, the supporting apparatus comprises a wheel pair, an vehicle frame and an air spring positioned on the vehicle frame, a support spring is arranged between the wheel pair and the vehicle frame, the bottom part of the vehicle frame is provided with support legs with each being provided with a screw hole, a transverse support adjusting device is arranged between the air spring and the vehicle frame, the air spring is fixedly mounted on the transverse support adjusting device, and during the test, the vehicle body falls onto the air spring, and simultaneously, the support spring is pressed downwards and the support legs of the vehicle frame come into contact with an auxiliary rail and are fixed by bolts; the vehicle frame is provided with a lifting lug and is connected with a wheel pair shaft via a lifting lug shaft.

* * * * *